(12) United States Patent
Wallin et al.

(10) Patent No.: US 12,018,752 B2
(45) Date of Patent: Jun. 25, 2024

(54) CLUTCH ENGAGING ARRANGEMENT

(71) Applicant: VOLVO CONSTRUCTION EQUIPMENT AB, Eskilstuna (SE)

(72) Inventors: Fredrik Wallin, Eskilstuna (SE); Mats Åkerblom, Eskilstuna (SE); Johan Sahlberg, Eskilstuna (SE); Max Öberg, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/769,297

(22) PCT Filed: Oct. 18, 2019

(86) PCT No.: PCT/EP2019/078347
§ 371 (c)(1),
(2) Date: Apr. 14, 2022

(87) PCT Pub. No.: WO2021/073750
PCT Pub. Date: Apr. 22, 2021

(65) Prior Publication Data
US 2024/0141989 A1    May 2, 2024

(51) Int. Cl.
*F16H 63/30*    (2006.01)
(52) U.S. Cl.
CPC ................. *F16H 63/3026* (2013.01)
(58) Field of Classification Search
CPC ............. F16H 63/3026; F16H 63/3036; F16D 25/0638; F16D 2129/02; F16D 13/70
See application file for complete search history.

(56) References Cited

U.S. PATENT DOCUMENTS

| 4,657,127 | A | | 4/1987 | Boffelli | |
|---|---|---|---|---|---|
| 5,749,451 | A | | 5/1998 | Grochowski | |
| 5,931,275 | A | * | 8/1999 | Kasuya | F16H 63/3026 192/109 R |
| 2012/0103751 | A1 | * | 5/2012 | Ikeda | F16D 25/0638 192/85.01 |
| 2016/0146310 | A1 | * | 5/2016 | Naito | F16H 57/08 475/140 |

(Continued)

FOREIGN PATENT DOCUMENTS

| CN | 106195054 A | 12/2016 |
|---|---|---|
| CN | 208203843 U | 12/2018 |
| DE | 19745344 A1 | 4/1998 |

(Continued)

OTHER PUBLICATIONS

First Office Action for Chinese Patent Application No. 201980101368. 8, dated Feb. 11, 2023, 7 pages.

(Continued)

*Primary Examiner* — Jacob S. Scott
*Assistant Examiner* — Farhana Pervin
(74) *Attorney, Agent, or Firm* — Sage Patent Group

(57) ABSTRACT

Provided is a clutch engaging arrangement for a clutch of a transmission arrangement. The clutch engaging arrangement includes a spring-loaded connecting rod having a connecting portion arranged at a distance from an engaging member of the clutch engaging arrangement when the engaging member assumes the first disengaged position.

18 Claims, 6 Drawing Sheets

(56) References Cited

U.S. PATENT DOCUMENTS

2018/0156283 A1\* 6/2018 Deneszczuk ........ F16D 25/0638
2018/0245643 A1\* 8/2018 Caumartin .......... F16D 25/0638

FOREIGN PATENT DOCUMENTS

| DE | 10240679 A1 | 3/2004 |
| DE | 102016125300 A1 | 6/2018 |
| EP | 3009711 A1 | 4/2016 |
| JP | H074956 U | 1/1995 |
| JP | 2015/194178 A | 11/2015 |
| WO | WO 2018/143071 A1 | 8/2018 |

OTHER PUBLICATIONS

International Search Report and Written Opinion of the International Searching Authority, PCT/EP2019/078347, dated Jun. 25, 2020, 14 pages.

\* cited by examiner

CLUTCH ENGAGING ARRANGEMENT

CROSS REFERENCE TO RELATED APPLICATIONS

This application is a 35 U.S.C. § 371 national stage application of PCT International Application No. PCT/EP2019/078347 filed on Oct. 18, 2019, the disclosure and content of which is incorporated by reference herein in its entirety.

TECHNICAL FIELD

The present disclosure relates to a clutch engaging arrangement, a clutch arrangement and a method for controlling a clutch engaging arrangement. The clutch engaging arrangement is applicable for clutch arrangements of a transmission arrangement, in particular for clutch arrangements arranged in a vehicle transmission arrangement. Although the clutch engaging arrangement will mainly be described in relation to a working machine in the form of an articulated hauler, it may also be applicable for other types of transmission arrangements.

BACKGROUND

In connection with transportation of heavy loads at construction sites or the like, a working machine is often used. The working machines may be utilized for transportations in connection with road or tunnel building, sand pits, mines, forestry and similar environments. Thus, the working machine is frequently operated with large and heavy loads in rough terrain and on slippery ground where no regular roads are present.

In order to fulfil the desired demands from the field of technology where the working machine is frequently operated, high quality of the vehicle transmission arrangement is necessary. The transmission arrangement may advantageously comprise one or more planetary gear sets for executing gear shift between different gear stages. When shifting between gear stages of the transmission arrangement, a clutch/brake is conventionally used, which clutch is engaged/disengaged depending on the specific gear stage.

The transmission arrangement of a working machine is designed to handle relatively high torque levels due to operation with the large and heavy loads. As a consequence, the shift elements, i.e. the clutches and brakes must be relatively large to be able to handle such high torque loads. However, large sized shift elements comprise large engaging pistons which need a substantial amount of pressurized fluid for being able to engage the shift elements. Due to the relative limited flow capacity of the pump supplying such pressurized fluid, the time period for engaging the shift elements will be long.

Accordingly, there is a desire to improve the transmission arrangement for being able to execute gear shifts more rapidly.

SUMMARY

It is an object of the present disclosure to describe a clutch engaging arrangement which at least partially overcomes the above described deficiencies. This is achieved by a clutch engaging arrangement according to claim 1.

According to a first aspect, there is provided a clutch engaging arrangement for a clutch of a transmission arrangement; the clutch engaging arrangement comprising an engaging member configured to be movable between a first disengaged position and an engaged position, in which engaged position the engaging member is arranged to position the clutch in an engaged state; and a spring-loaded connecting rod comprising a connecting portion arranged in abutment with a portion of the engaging member when the engaging member assumes the engaged position for exposing the engaging member to a return force in a direction towards the first disengaged position, wherein the connecting portion of the spring-loaded connecting rod is arranged at a distance from the engaging member, in a direction towards the engaged position, when the engaging member assumes the first disengaged position.

The wording "engaging member" should be construed as a member/device which is arranged to force the clutch to be positioned in an engaged state where torque can be transmitted through the clutch. Thus, the first disengaged position should be interpreted as a position of the engaging member where no torque is transmitted through the clutch, while the engaged position should be interpreted as a position of the engaging member where torque is transmitted through the clutch.

Furthermore, the distance between the connecting portion of the spring-loaded connecting rod and the engaging member should be understood as a geometric gap by which the spring-loaded connecting rod and the engaging member are in no contact with each other. Thus, the engaging member needs to travel the distance formed by the geometric gap before the spring-loaded connecting rod exposes the engaging member to the return force.

An advantage is thus that the engaging member can be pre-actuated without the risk of arranging the clutch in the engaged state. The pre-actuation of the engaging member is preferably performed by supplying a flow of actuating fluid to a part of the engaging member, where the force resulting from the pressure level of the actuating fluid is lower than the return force of the spring-loaded connecting rod, thereby reducing the risk of engaging the clutch during pre-actuation. An advantage of being able to pre-actuating the engaging member is that a more rapid subsequent engagement of the clutch can be obtained. Hence, a faster gear shift is provided. According to a further advantage, the need for complex position sensors is reduced as it can be sufficient to simply control the pressure level for pre-actuating the engaging member.

According to an example embodiment, the engaging member may be arranged to assume an intermediate disengaged position arranged between the first disengaged position and the engaged position, the connecting portion of the spring-loaded connecting rod being arranged in abutment with the portion of the engaging member once the engaging member assumes the intermediate disengaged position.

The intermediate disengaged position should thus be construed as a position of the engaging member at which the clutch is still arranged in a disengaged state, i.e. not connected to supply torque. Accordingly, and according to an example embodiment, the clutch may be arranged to be positioned in the disengaged state when the engaging member assumes the intermediate disengaged position. Thus, the clutch is arranged in a disengaged state when the engaging member travels between the first disengaged position and the intermediate disengaged position. In further detail, the connecting portion of the spring-loaded connecting rod is not in abutment with the portion of the engaging member during the travel from the first disengaged position to the intermediate disengaged position.

It should however be readily understood that the engaging member may be arranged in physical contact with the clutch when the engaging member assumes the intermediate disengaged position, but not to such extent as to arrange the clutch in the engaged state for supplying torque.

According to an example embodiment, the clutch engaging arrangement may further comprise a spacer element arranged in abutment with the connecting portion of the spring-loaded connecting rod when the engaging member assumes the first disengaged position for generating the distance between the spring-loaded connecting rod and the engaging member.

Hereby, the spacer element can be arranged to serve the function of achieving the distance between the connecting portion of the spring-loaded connecting rod and the engaging member. Preferably, the spacer element is arranged in abutment with the same surface of the spring-loaded connecting portion as the surface the engaging member abuts when arranging the clutch in the engaged state, although at a different position of the surface.

According to an example embodiment, a length of the spacer element may be proportional to a distance between the first disengaged position and the intermediate disengaged position.

By "proportional" should be understood as a factor of the additional distance traveled by the engaging member before positioned in the intermediate disengaged position when providing the spacer element.

According to an example embodiment, the clutch engaging arrangement may comprise a stationary wall at which the engaging member is positioned when assuming the first disengaged position. Hereby, the stationary wall can serve as a contact surface for the engaging member when assuming the first disengaged position.

According to an example embodiment, the spacer element may be a washer plate. According to an example embodiment, the washer plate may be connected to the stationary wall at a distance in at least one of a radial and circumferential direction from the spring-loaded connecting rod.

An advantage is that the washer plate can be added to the clutch engaging arrangement relatively easily. The washer plate can hereby be connected to the stationary wall after the clutch engaging arrangement has been produced. Hereby, the washer plate can thus be connected to the stationary wall of previously produced clutch engaging arrangements not initially provided with the gap between the connecting portion of the spring-loaded connecting rod and the engaging member.

According to an example embodiment, the spring-loaded connecting rod may be an elongated spring-loaded connecting rod extending through a through-hole of the stationary wall.

According to an example embodiment, the elongated spring-loaded connecting rod may comprise a resilient member for exposing the engaging member to the return force when the engaging member assumes the engaged position, wherein the resilient member is positioned on an opposite side of the stationary wall compared to the position of the connecting portion.

Hereby, the resilient member is exposed to a compression force when the engaging member assumes the engaged position According to an example embodiment, a rear end of the engaging member and the stationary wall may form a cavity arranged to receive pressurized fluid for moving the engaging member towards the engaged position. Pressurized fluid is thus supplied to the cavity, which forces the engaging member towards the engaged position.

According to an example embodiment, the spring-loaded connecting rod may comprise an elongated portion along which the engaging member is arranged to move when being directed from the first disengaged position towards the engaged position, wherein the connecting portion is arranged at an outer end portion of the elongated portion.

According to a second aspect, there is provided a clutch arrangement for a transmission, the clutch arrangement comprising a clutch controllable between an engaged state and a disengaged state, and a clutch engaging arrangement according to any one of the embodiments described above in relation to the first aspect for controlling the clutch between the engaged state and the disengaged state.

According to an example embodiment, the spring-loaded connecting rods may form part of a first set of spring-loaded connecting rods, wherein the clutch arrangement comprises a second set of spring-loaded connecting rods, the spring-loaded connecting rods of the second set of spring-loaded connecting rods comprising a respective connecting portion arranged in abutment with a portion of the engaging member when the engaging member assumes the first disengaged position.

An advantage of providing a combination of a first and a second set spring loaded connecting rods is that the second set of spring-loaded connecting rods can fully retract the engaging member to the first disengaged position.

According to an example embodiment, the clutch may be a friction disc clutch.

Further effects and features of the second aspect are largely analogous to those described above in relation to the first aspect.

According to a third aspect, there is provided a method for controlling a clutch engaging arrangement for a clutch of a transmission, wherein the clutch engaging arrangement comprises an engaging member movable between a first disengaged position and an engaged position, in which engaged position the engaging member is arranged to position the clutch in an engaged state; and a spring-loaded connecting rod comprising a connecting portion arranged in abutment with a portion of the engaging member when the engaging member assumes the engaged position for exposing the engaging member to a return force in a direction towards the first disengaged position, wherein the connecting portion of the spring-loaded connecting rod is arranged at a distance from the engaging member, in a direction towards the engaged position, when the engaging member assumes the first disengaged position, wherein the method comprises the steps of: receiving a signal indicative of a potential upcoming gear shift of the transmission arrangement; moving the engaging member from the first disengaged position to an intermediate disengaged position arranged between the first disengaged position and the engaged position, in which intermediate disengaged position the connecting portion of the spring-loaded connecting rod being arranged in abutment with the portion of the engaging member; receiving a signal indicative of execution of the gear shift; and moving the engaging member from the intermediate disengaged position to the engaged position for finalizing the gear shift.

According to a fourth aspect, there is provided a vehicle comprising a transmission, the transmission comprising a clutch arrangement according to any one of the embodiments described above in relation to the first aspect.

Effects and features of the third and fourth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
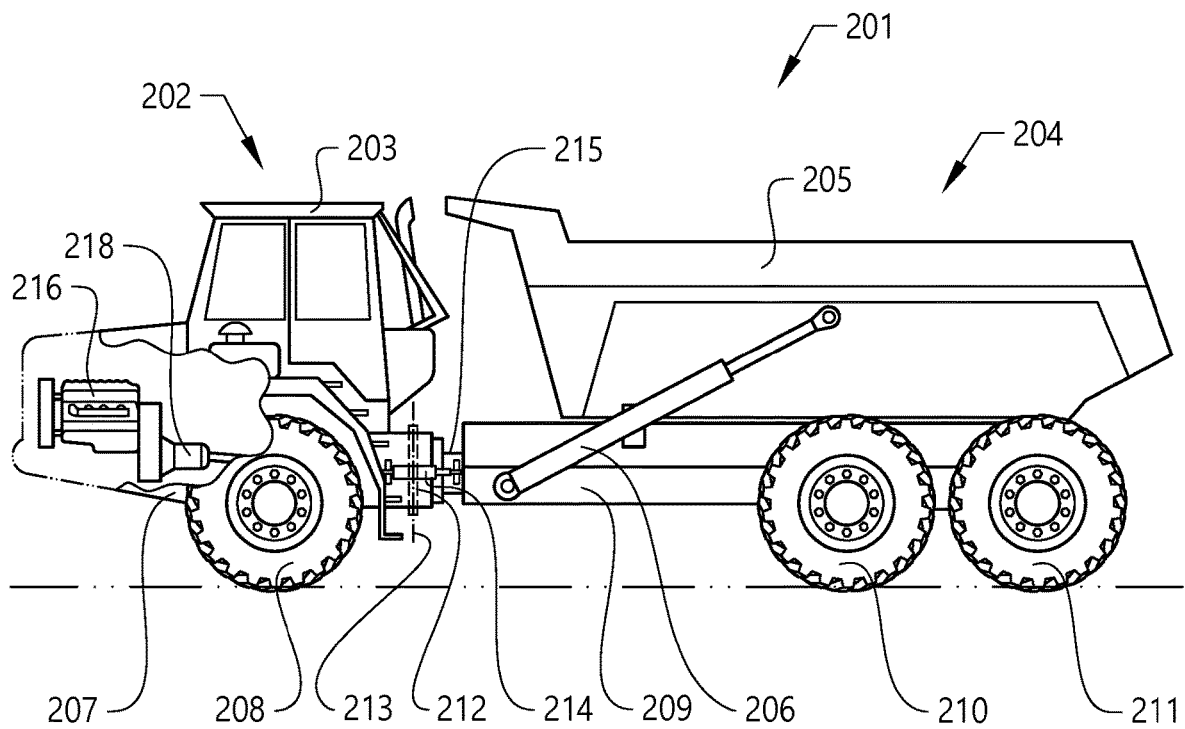
FIG. 1 is a lateral side view illustrating a working machine in the form of an articulated hauler.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 is a side view of a working machine 201 in the form of an articulated hauler having a tractor unit 202 with a cab 203 for a driver and a trailer unit 204 with a platform having a dump body 205, here in the form of a container, arranged thereon, for receiving load. The dump body 205 is preferably pivotally connected to the rear section and tiltable by means of a pair of tilting cylinders 206, for example hydraulic cylinders. The tractor unit 202 has a frame 207 and a pair of wheels 208 suspended from the frame 207. The trailer unit 204 has a frame 209 and two pair of wheels 210, 211 suspended from the frame 209.

The working machine is frame-steered, i.e. there is a joint arrangement 212 connecting the tractor unit 202 and the trailer unit 204 of the working machine 201. The tractor unit 202 and the trailer unit 204 are pivotally connected to each other for pivoting around a substantially vertical pivot axis 213.

The working machine preferably comprises a hydraulic system having two hydraulic cylinders 214, steering cylinders, arranged on opposite sides of the working machine for turning the working machine by means of relative movement of the tractor unit 202 and the trailer unit 204. The hydraulic cylinders can, however, be replaced by any other linear actuator for steering the machine, such as an electromechanical linear actuator.

Furthermore, the articulated hauler comprises a prime mover 216, here illustrated as an internal combustion engine, and a gearbox 218 having a transmission arrangement.

Figure 2:
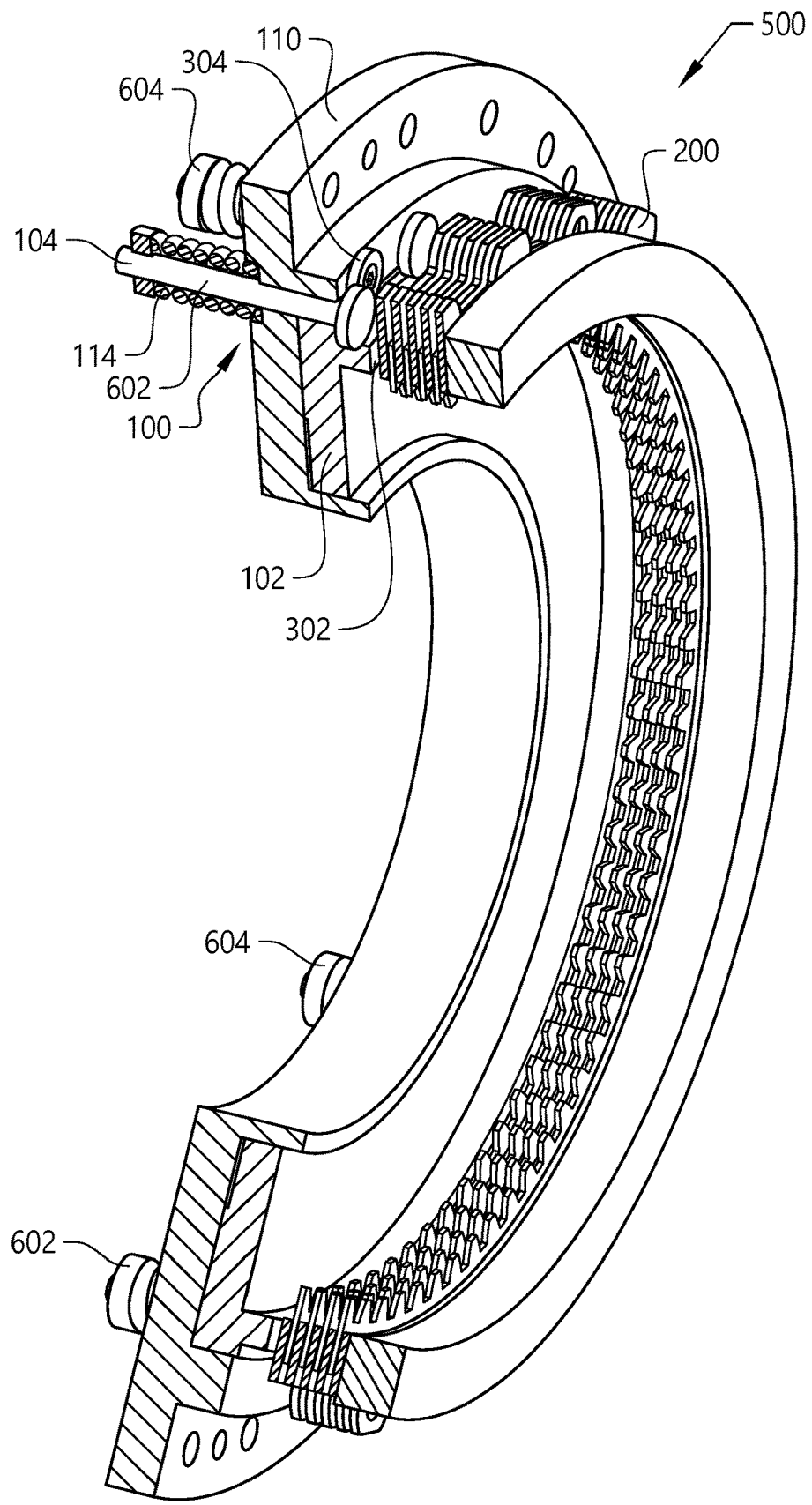
FIG. 2 is a cross sectional perspective view of a clutch arrangement according to an example embodiment.

Turning now to FIG. 2 which illustrates a clutch arrangement 500 according to an example embodiment. The clutch arrangement 500 in FIG. 2 is particularly well suited for the transmission arrangement of the working machine in FIG. 1. The clutch arrangement 500 comprises a clutch 200 controllable between an engaged state, at which the clutch arrangement 500 is arranged to transmit a torque load, and a disengaged state at which no torque can be transmitted through the clutch arrangement 500. The clutch is preferably a friction disc clutch which can also be arranged in a slipping state. Throughout the entire description, the definition "engaged state" of the clutch should also include such slipping state of a friction clutch. Furthermore, the clutch depicted in FIG. 2 extends in a circumferential direction around a transmission shaft (not shown).

Moreover, the clutch arrangement 500 comprises a clutch engaging arrangement 100 arranged for controlling the clutch 500 between the engaged state and the disengaged state. Thus, by means of controlling the clutch engaging arrangement 100, the clutch can be engaged and disengaged. The clutch engaging arrangement 100 comprises a circumferentially extending engaging member 102. The engaging member 102 comprises a clutch engaging portion 302 facing the clutch 200. The clutch engaging portion 302 is arranged to be in contact with the clutch 200 when controlling the clutch 200 to be arranged in the engaged state. The engaging member 102 can also be referred to as an engaging piston.

The clutch engaging arrangement 100 further comprises a plurality of spring-loaded connecting rods 104 as well as at least one spacer element 304. Also, the clutch engaging arrangement 100 depicted in FIG. 2 comprises a stationary wall 110 through which the spring-loaded connecting rod is provided. The spring-loaded connecting rod, which is illustrated as an elongated spring-loaded connecting rod comprises a resilient member 114, exemplified as a coil spring, positioned on an opposite side of the stationary wall in comparison to the position of the engaging member 102.

The plurality of spring-loaded connecting rods 104 form a first set 602 of spring-loaded connecting rods and a second set 604 of spring-loaded connecting rods. As can be seen in FIG. 2, the first set 602 of spring-loaded connecting rods are arranged in connection with a respective spacer element 304, while the second set 604 of spring-loaded connecting rods is not arranged in connection to such a spacer element. The following will now describe the clutch engaging arrangement 100 in further detail, and in particular in conjunction with the spring-loaded connecting rods of the first set 602 of spring-loaded connecting rods.

Figure 3:
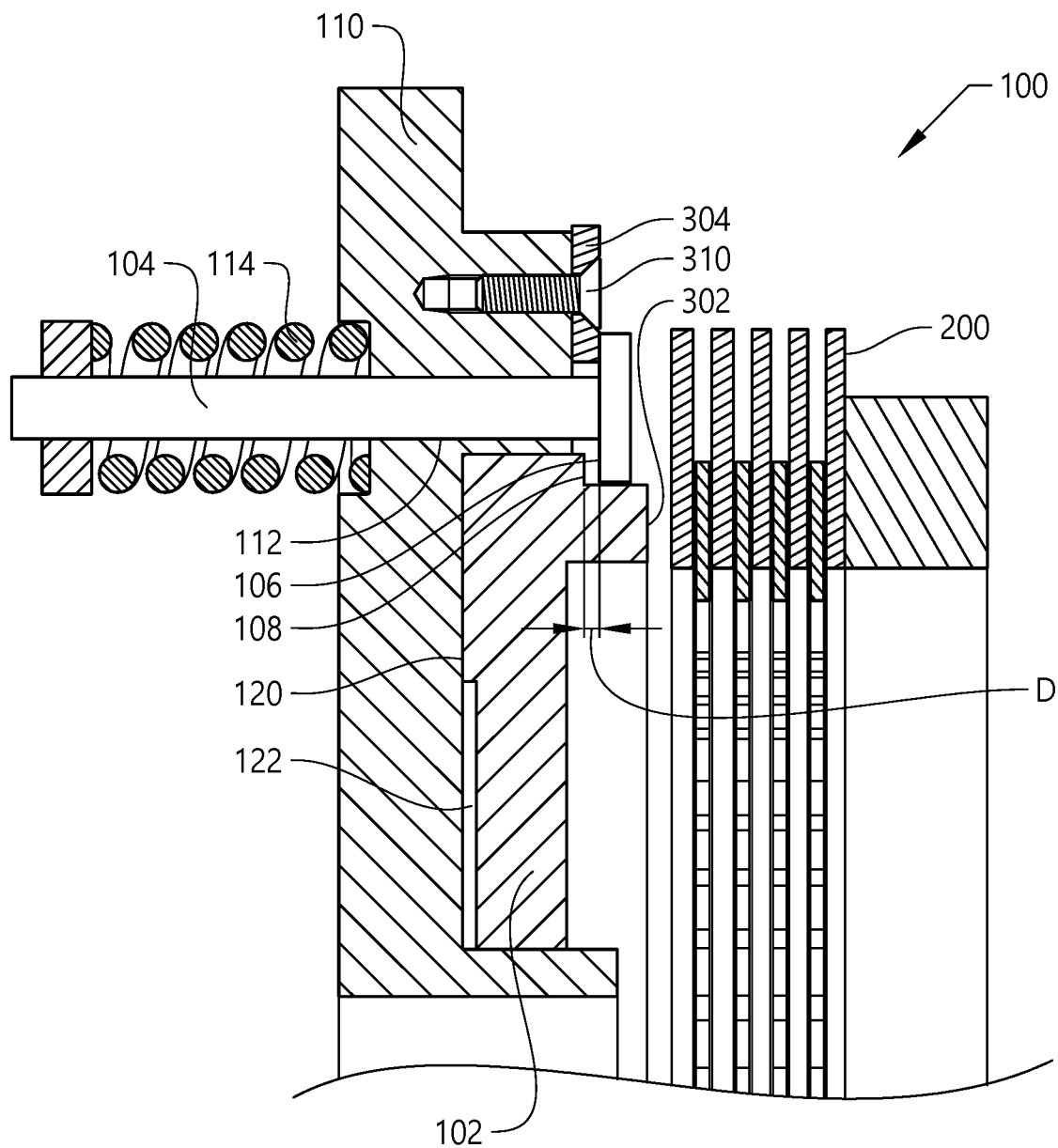
FIGS. 3-5 are cross-sectional side views of clutch engaging arrangements according to example embodiments.

Reference is first made to FIG. 3 which illustrates the clutch engaging arrangement 100 according to an example embodiment. The clutch engaging arrangement 100 comprises the engaging member 102, in FIG. 3 illustrated in a first disengaged position at the stationary wall 110. The engaging member 102 is movable between the first disengaged position and an engaged position. When the engaging member 102 assumes the engaged position, the clutch 200 is arranged in the engaged state. The engaging member 102 is thus moved to the right side in FIG. 3 when assuming the engaged position. As will be described further below, the engaging member 102 is also arranged to assume an intermediate disengaged position arranged between the first disengaged position and the engaged position.

As can further be seen, a cavity 122 is formed by a rear end 120 of the engaging member 102 and the stationary wall 110. The clutch engaging arrangement 100 is arranged to receive a pressurized fluid, preferably pressurized hydraulic oil, into the cavity 122 for moving the engaging member 102 towards the clutch 200 for positioning the clutch 200 in the engaged state when the engaging member 102 assumes the engaged position.

As also described above in relation to the description of FIG. 2, the clutch engaging arrangement 100 comprises the spring-loaded connecting rod 104 which extends through the through-hole 112 of the stationary wall 110. The spring-loaded connecting rod 104 comprises the coil spring 114 on one side of the stationary wall 110, and a connecting portion 106 on the other side of the stationary wall 110.

Furthermore, the connecting portion 106 of the spring-loaded connecting rod 104 is arranged at a distance (D) from the engaging member 102, in a direction towards the clutch 200, when the engaging member assumes the first disengaged position illustrated in FIG. 3. The distance (D) is thus a non-zero distance between the connecting portion 106 of the spring-loaded connecting rod 104 and the engaging member 102. In detail, the connecting portion 106 of the spring-loaded connecting rod 104 is arranged at a distance (D) from a portion 108 of the engaging member 102. According to the embodiment depicted in FIG. 3, the distance (D) is achieved by means of the spacer element 304. The spacer element 304 is connected to the stationary wall 110 at a distance in at least one of the radial and circumferential distance from the spring-loaded connecting rod 104. The connecting portion 106 of the spring-loaded connecting rod 104 hereby exerts a compression force on the spacer element 304 by means of the pre-tensioned coil spring 114. According to the example embodiment of FIG. 3, the spacer element 304 is connected to the stationary wall 110 by means of a screw connection 310, although other configurations are conceivable.

The following will now describe the functionality of the clutch engaging arrangement 100. As has been previously outlined, the engaging member 102 assumes the first disengaged position illustrated in FIG. 3 when the clutch is arranged in the disengaged state. Thereafter, when there is an indication of a potential upcoming gear shift of the transmission arrangement, which gear shift involves engagement of the clutch 200, pressurized fluid is supplied into the cavity 122. Hereby, the engaging member 102 will move from the first disengaged position to the intermediate disengaged position. The intermediate disengaged position is defined as the position where the portion 108 of the engaging member 102 is arranged in abutment with the connecting portion 106 of the spring-loaded connecting rod 104. The pressure level of the pressurized fluid supplied to the cavity 122 is in this stage of such magnitude that the spring load of the spring-loaded connecting rod will maintain the spring-loaded connecting rod stationary. The clutch engaging portion 302 may be arranged in abutment with the clutch but not to such an extent as to arrange the clutch in the engaged state. Hereby, a pre-actuation of the engaging member 102 has been achieved.

Thereafter, when a signal is received which indicates that the gear shift should be executed, a further flow of pressurized fluid is provided for forcing the engaging member to assume the engaged position and thereby arrange the clutch in the engaged state. When the engaging member is moved from the intermediate disengaged position to the engaged position, the connecting portion 106 of the spring-loaded connecting rod 104 will follow the movement of the engaging member 102.

Figure 4:
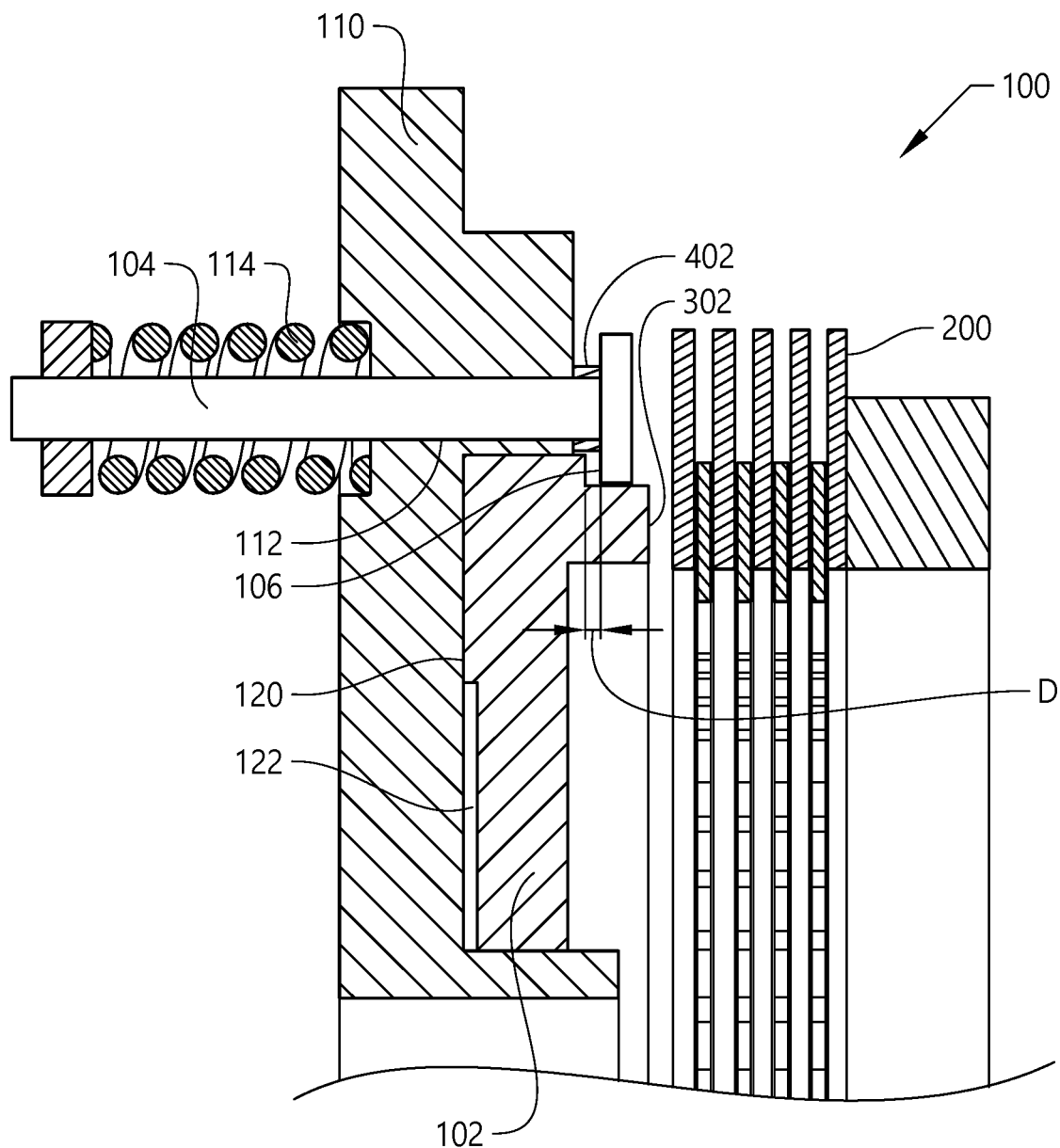
Figure 5:
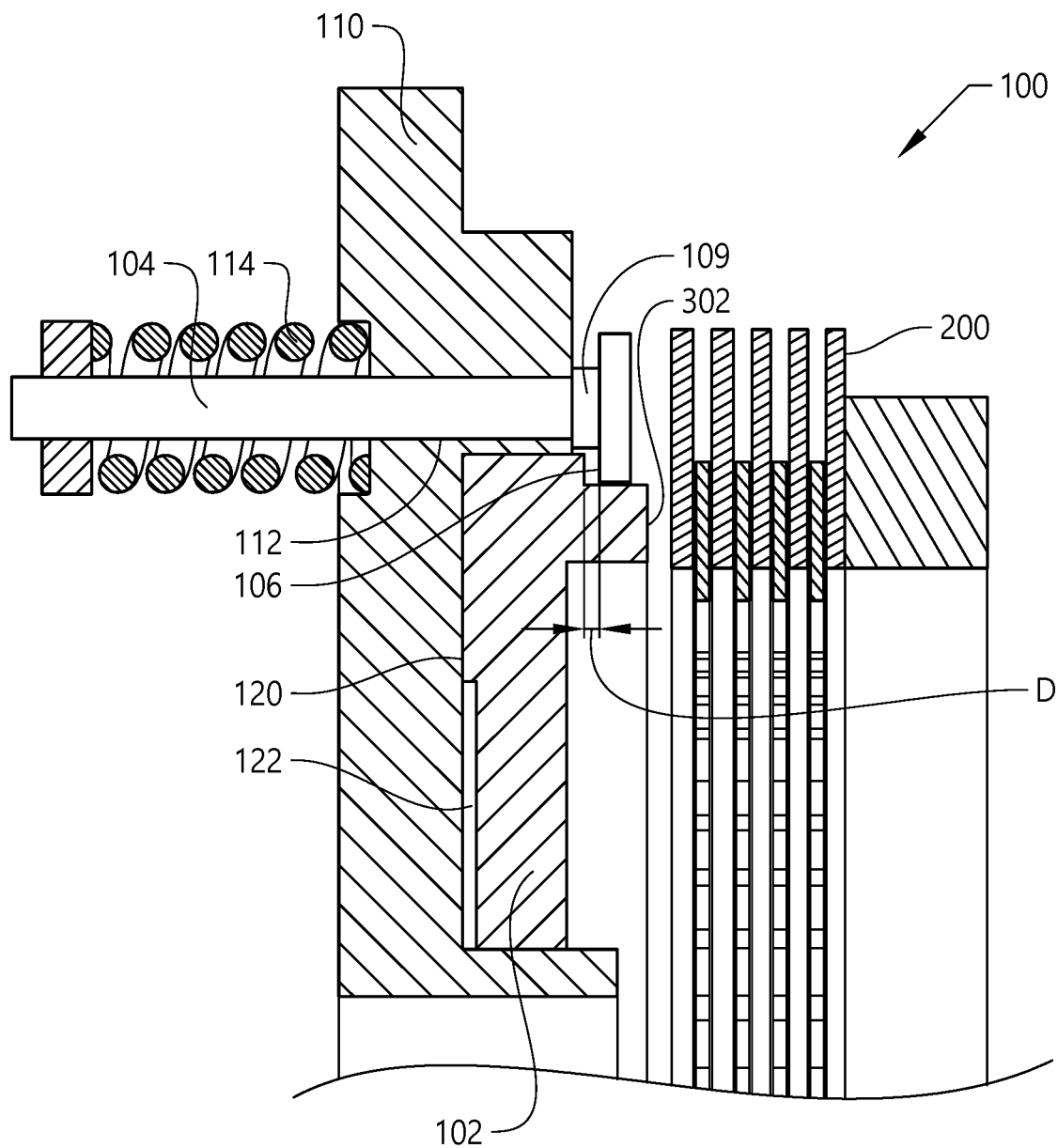

Reference is now made to FIGS. 4 and 5 which illustrate further embodiments for achieving the distance (D) between the connecting portion 106 of the spring-loaded connecting rod 104 and engaging member 102.

As can be seen in FIG. 4, the distance (D) is effectuated by means of a spacer element in the form of a washer plate 402 arranged between the stationary wall 110 and the connecting portion 106 of the spring-loaded connecting rod 104. The spring-loaded connecting rod 104 is thus arranged through the washer plate 402.

With reference to FIG. 5, the spring-loaded connecting rod 104 comprises an elongated portion 109 at an outer end of the spring-loaded connecting rod 104 for effectuating the distance (D). The engaging member 104 is thus arranged to move along the elongated portion 109 when being directed from the first disengaged position towards the engaged position.

Figure 6:
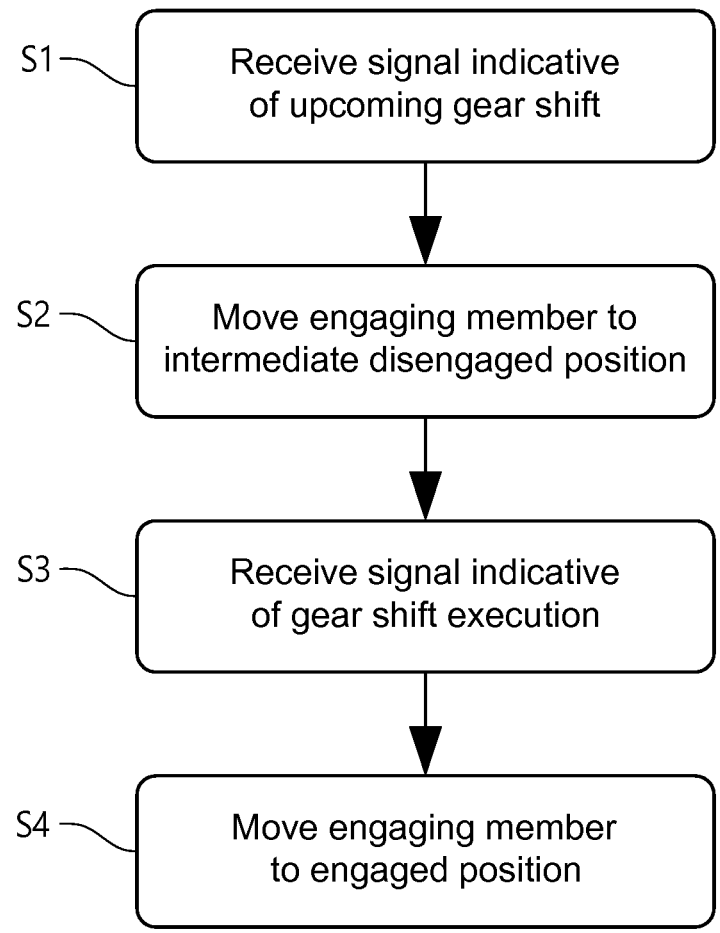
FIG. 6 is a flow chart of a method for controlling a clutch engaging arrangement according to an example embodiment.

To summarize the method for controlling the clutch engaging arrangement described above, reference is made to FIG. 6. Firstly, a signal is received S1 which indicates a potential upcoming gear shift of the transmission arrangement. The gear shift involves that the clutch 200 is moved from a disengaged state to an engaged state. Hereby, the engaging member is moved S2 from the first disengaged position to the intermediate disengaged position. The connecting portion 106 of the spring-loaded connecting rod 104 is at this stage arranged in abutment with the portion 108 of the engaging member 104. Thereafter, a signal is received S3 which indicates that the gear shift should be executed. The engaging member 102 is therefore moved S4 from the intermediate disengaged position to the engaged position for finalizing the gear shift.

It is to be understood that the present disclosure is not limited to the embodiments described above and illustrated in the drawings; rather, the skilled person will recognize that many changes and modifications may be made within the scope of the appended claims.

The invention claimed is:

1. A clutch engaging arrangement for a clutch of a transmission arrangement; the clutch engaging arrangement comprising:
    an engaging member configured to be movable between a first disengaged position and an engaged position, in which engaged position the engaging member is arranged to position the clutch in an engaged state; and
    a spring-loaded connecting rod comprising a connecting portion arranged in abutment with a portion of the engaging member when the engaging member assumes the engaged position for exposing the engaging member to a return force in a direction towards the first disengaged position, wherein the connecting portion of the spring-loaded connecting rod is arranged at a distance from the engaging member, in a direction towards the engaged position, when the engaging member assumes the first disengaged position.

2. The clutch engaging arrangement according to claim 1, wherein the engaging member is arranged to assume an intermediate disengaged position arranged between the first disengaged position and the engaged position, the connecting portion of the spring-loaded connecting rod being arranged in abutment with the portion of the engaging member once the engaging member assumes the intermediate disengaged position.

3. The clutch engaging arrangement according to claim 2, wherein the clutch is arranged to be positioned in a disengaged state when the engaging member assumes the intermediate disengaged position.

4. The clutch engaging arrangement according to claim 1, further comprising a spacer element arranged in abutment with the connecting portion of the spring-loaded connecting rod when the engaging member assumes the first disengaged position for generating the distance between the spring-loaded connecting rod and the engaging member.

5. The clutch engaging arrangement according to claim 4 wherein the engaging member is arranged to assume an intermediate disengaged position arranged between the first disengaged position and the engaged position, the connecting portion of the spring-loaded connecting rod being arranged in abutment with the portion of the engaging member once the engaging member assumes the intermediate disengaged position, and, wherein a length of the spacer element is proportional to a distance between the first disengaged position and the intermediate disengaged position.

6. The clutch engaging arrangement according to claim 1, wherein the clutch engaging arrangement comprises a stationary wall at which the engaging member is positioned when assuming the first disengaged position.

7. The clutch engaging arrangement according to claim 6, further comprising a spacer element arranged in abutment with the connecting portion of the spring-loaded connecting rod when the engaging member assumes the first disengaged position for generating the distance between the spring-loaded connecting rod and the engaging member, wherein the spacer element is a washer plate.

8. The clutch engaging arrangement according to claim 7, wherein the washer plate is connected to the stationary wall.

9. The clutch engaging arrangement according to claim 8, wherein the washer plate is connected to the stationary wall at a distance in at least one of a radial and circumferential direction from the spring-loaded connecting rod.

10. The clutch engaging arrangement according to claim 6, wherein the spring-loaded connecting rod is an elongated spring-loaded connecting rod extending through a through-hole of the stationary wall.

11. The clutch engaging arrangement according to claim 10, wherein the elongated spring-loaded connecting rod comprises a resilient member for exposing the engaging member to the return force when the engaging member assumes the engaged position, wherein the resilient member is positioned on an opposite side of the stationary wall compared to the position of the connecting portion.

12. The clutch engaging arrangement according to claim 6, wherein a rear end of the engaging member and the stationary wall form a cavity arranged to receive pressurized fluid for moving the engaging member towards the engaged position.

13. The clutch engaging arrangement according to claim 1, wherein the spring-loaded connecting rod comprises an elongated portion along which the engaging member is arranged to move when being directed from the first disengaged position towards the engaged position, wherein the connecting portion is arranged at an outer end portion of the elongated portion.

14. A clutch arrangement for a transmission, the clutch arrangement comprising a clutch controllable between an engaged state and a disengaged state, and a clutch engaging arrangement according to a claim 1 for controlling the clutch between the engaged state and the disengaged state.

15. The clutch arrangement according to claim 14, wherein the spring-loaded connecting rods form part of a first set of spring-loaded connecting rods, wherein the clutch arrangement comprises a second set of spring-loaded connecting rods, the spring-loaded connecting rods of the second set of spring-loaded connecting rods comprising a respective connecting portion arranged in abutment with a portion of the engaging member when the engaging member assumes the first disengaged position.

16. The clutch arrangement according to claim 14, wherein the clutch is a friction disc clutch.

17. A vehicle comprising a transmission, the transmission comprising a clutch arrangement according to claim 14.

18. A method for controlling a clutch engaging arrangement for a clutch of a transmission, wherein the clutch engaging arrangement comprises an engaging member movable between a first disengaged position and an engaged position, in which engaged position the engaging member is arranged to position the clutch in an engaged state; and a spring-loaded connecting rod comprising a connecting portion arranged in abutment with a portion of the engaging member when the engaging member assumes the engaged position for exposing the engaging member to a return force in a direction towards the first disengaged position, wherein the connecting portion of the spring-loaded connecting rod is arranged at a distance from the engaging member, in a direction towards the engaged position, when the engaging member assumes the first disengaged position, wherein the method comprises the steps of:

receiving a signal indicative of a potential upcoming gear shift of the transmission arrangement;

moving the engaging member from the first disengaged position to an intermediate disengaged position arranged between the first disengaged position and the engaged position, in which intermediate disengaged position the connecting portion of the spring-loaded connecting rod being arranged in abutment with the portion of the engaging member;

receiving a signal indicative of execution of the gear shift; and moving the engaging member from the intermediate disengaged position to the engaged position for finalizing the gear shift.

* * * * *